United States Patent Office 3,208,970
Patented Sept. 28, 1965

3,208,970
POLYPROPYLENE STABILIZED WITH THE DI-
BUTYL TIN SALT OF 2,6 DI-t-BUTYL-α-DI-
METHYL-AMINO-p-CRESOL
Joseph H. Tazewell, Akron, and Robert J. Reid, Canal
Fulton, Ohio, assignors to The Firestone Tire & Rubber
Company, Akron, Ohio, a corporation of Ohio
No Drawing. Filed Dec. 7, 1964, Ser. No. 416,597
1 Claim. (Cl. 260—45.75)

This invention relates to stabilization of α-monoolefins. More particularly, the invention is concerned with stabilization of α-monoolefins against deterioration from heat, light and air. This application is a continuation-in-part of our copending application Serial No. 61,053, filed October 7, 1960, now abandoned.

In recent years great advances have been made as a result of new catalysis concepts in directing the polymerization of α-monoolefins to produce homopolymers and copolymers of extraordinary properties. In the case of ethylene, for example, polyethylene of unusual linearity and unusually improved properties is obtained by following these new concepts of catalysis. In the case of propylene and higher α-monoolefins such as butene-1, pentene-1, hexene-1, methyl substituted butene-1, methyl substituted pentene-1, and other higher α-monoolefins including styrene, methyl styrenes and the like, polymerization can be selectively directed to produce either a highly stereo-regular configuration or a relatively amorphous, non-stereo-regular configuration. Depending on the choice of particular catalyst combinations, the polymers have either highly stereo-regular isotactic or syndiotactic configurations or have non-stereo-regular configurations. These highly desirable new polymers are made possible by employment of a catalyst which is properly selected from, in the one instance, a transition metal compound and in the other instance, a metal-based reducing agent. In the case of the highly linear polyethylene, an effective catalyst combination has been used which is made up on the one of a titanium halide and on the other hand of an aluminum hydrocarbon. One of the earliest catalyst combinations of this type was a mixture of titanium tetrachloride and an aluminum trialkyl. In order to produce the stereo-regular poly-α-monoolefins from higher α-monoolefins such as propylene, similar catalysts are used. One of the successful combinations of a transition metal compound and a metal-based reducing agent for the production of isotactic polypropylene is a catalyst composed, on the one hand of a titanium trihalide such as titanium trichloride along with a reducing aluminum compound such as an aluminum trialkyl or an aluminum dialkyl halide.

Highly linear polyethylene of the type generally referred to above is as compared to higher α-monoolefin polymers substantially less prone to deterioration resulting from exposure to heat and light. The homopolymers of the higher α-monoolefins, as represented by polypropylene and copolymers of higher α-monoolefins with other α-monoolefins, as represented by ethylene-propylene copolymers, are on the other hand quite sensitive to both heat and light, and require more effective stabilization than does linear polyethylene in order to realize the high degree of commercial utility which such polymers would otherwise enjoy. It has been discovered that stabilization techniques which have been suitable in the case of previously known polymers, as well as linear polyethylene cannot be relied upon to effectively stabilize higher poly-α-monoolefins and copolymers thereof. Particular difficulty is experienced in effectively stabilizing polymers containing higher α-monoolefins without unduly changing the normal light color of such polymers.

An object, therefore, of the present invention is provision of highly heat and light stabilized homopolymers and copolymers of higher α-monoolefin. Another object of the invention is provision of a class of compounds which effectively stabilize α-monoolefins against deterioration by heat and light. Still another object is effective stabilization of isotactic, syndiotactic and atactic and block polymers of $C_3$ to $C_9$ α-monoolefins. Still a further object of the invention is provision of light colored heat and light stable polymers including copolymers of α-monoolefins. A further object is provision of heat and light stable isotactic polymers of $C_3$ to $C_9$ α-monoolefins.

The above and further objects are obtained in accordance with the invention by incorporating into α-monoolefin polymers relatively small amounts of di- and trialkyl tin salts of 2,6-di-alkyl-α-dimethylamino-p-cresol.

The amount of metallic salt employed in practice of the invention is always small but varies somewhat in dependence on the particular polymer being protected thereby, as well as on the type and amount of other additives suitably employed therewith. Suitable other additives will include other stabilizers, anti-oxidants, light and heat inhibitors, plasticizers, pigments including fillers and the like. Ordinarily, the amount of the metallic salts will be in the range of from about 0.01 to about 2.0 parts by weight per 100 parts by weight of polymer with from about 0.1 to about 1.5 parts by weight being preferred.

The above described metallic salts are incorporated or blended in polymers including copolymers of $C_3$ to $C_9$ α-monoolefins by any of the conventional methods used for incorporating additives into polymers. Typical of such methods are deposition from solvents or slurries, dry blending and blending on a mill or in other conventional masticators.

The effectiveness of the invention will be more clearly understood by reference to the following example which is illustrative of practice of the invention. By isotactic polypropylene is meant a polypropylene containing at least 80% by weight of isotactic polymer. The polymer tested in the example was about 95% or more isotactic. Addition of the additive was effected by forming a slurry in acetone of the polypropylene in powder form and the additive. The slurry was then stirred until dry and the dry mixture molded into plaques. Light and color stability was determined by exposing molded plaques to the rays of an S-1 Sunlamp and observing the number of hours to failure, as well as the color change at completion of the test. Failure was evidenced by the test piece having a badly cracked surface or being so brittle that it broke when bent through an angle of 90° C. Heat stability is determined by plasticity determinations before and after a test sample has been heated for 30 minutes at 200° C. Good heat stability is evidenced by an increase of plasticity of less than about 20% after the heat treatment. Poor heat stability is evidenced by more than a 20% increase in plasticity after the test.

*Example*

In 100 ml. of methanol 1.14 grams of sodium metal was dissolved. To this was added 13.1 grams of 2,6-di-t-butyl-α-dimethylamino-p-cresol. A solution of 7.69 grams of dibutyltin chloride in 100 ml. of methanol was added to the above mixture. The resulting mixture was concentrated in the hood at room temperature. The resulting solid yellow product was washed and dried. This was the dibutyltin salt of 2,6-di-t-butyl-α-dimethylamino-p-cresol. An isotactic polypropylene was tested with and without 1.0 part by weight of the dibutyltin salt in accordance with the invention per 100 parts by weight of polymer. The results were:

|  | Light Stability | | | Heat Stability |
|---|---|---|---|---|
|  | Hours to Failure | Original Color | Final Color |  |
| Control | 600 | White | Yellow | Poor. |
| Polypropylene of invention | 875 | Light green | Light yellow | Good. |

The polymers including copolymers of $C_3$ to $C_9$ α-monoolefins stabilized in accordance with the invention find commercial utility in widely varying applications, including both resinous and rubbery films, sheets, molded and extruded articles, filaments and the like.

While the invention has been illustrated in detailed terms concerning a certain specific embodiment, it must be appreciated and will be understood that the invention includes and contemplates considerable variation and modification within the spirit thereof and apparent to those skilled in the art.

What is claimed is:

A stable polypropylene containing about 0.01 to about 2.0 parts by weight per 100 parts by weight of polypropylene of the dibutyltin salt of 2,6-di-t-butyl-α-dimethylamino-p-cresol.

References Cited by the Examiner

Ethyl Corporation Technical Data Sheet, "Ethyl Antioxidant 703," 1 page, January 1959.

LEON J. BERCOVITZ, *Primary Examiner.*